United States Patent
Zuidema et al.

(10) Patent No.: US 9,046,628 B2
(45) Date of Patent: Jun. 2, 2015

(54) LENS STRUCTURE AND MANUFACTURING METHOD, AND THE MANUFACTURE OF SHAPED POLYMER ARTICLES

(75) Inventors: Hans Zuidema, Eindhoven (NL); Raymond Gijsbertus Anthonius Van Agthoven, Eindhoven (NL); Ivar Jacco Boerefijn, Eindhoven (NL); Henricus Joseph Cornelus Kuijpers, Haler (NL)

(73) Assignee: Koninklijke Philips N.V., Eindhoven (NL)

( * ) Notice: Subject to any disclaimer, the term of this patent is extended or adjusted under 35 U.S.C. 154(b) by 104 days.

(21) Appl. No.: 13/408,088

(22) Filed: Feb. 29, 2012

(65) Prior Publication Data

US 2012/0153517 A1     Jun. 21, 2012

Related U.S. Application Data

(62) Division of application No. 12/519,386, filed as application No. PCT/IB2007/055088 on Dec. 13, 2007.

(30) Foreign Application Priority Data

Dec. 19, 2006    (EP) ..................................... 06126447

(51) Int. Cl.
    *B23K 26/14*       (2014.01)
    *G02B 3/00*        (2006.01)
    *B29D 11/00*      (2006.01)

(52) U.S. Cl.
    CPC .......... *G02B 3/0031* (2013.01); *B23K 26/1476* (2013.01); *B29D 11/00278* (2013.01); *G02B 3/0025* (2013.01); *G02B 3/005* (2013.01)

(58) Field of Classification Search
    USPC ............ 359/463, 621; 264/1.32; 204/157.22; 430/321; 219/121.6, 121.67
    See application file for complete search history.

(56) References Cited

U.S. PATENT DOCUMENTS

| | | | |
|---|---|---|---|
| 4,793,703 A | 12/1988 | Fretz, Jr. | |
| 5,298,366 A * | 3/1994 | Iwasaki et al. | ................ 430/321 |
| 5,554,432 A * | 9/1996 | Sandor et al. | ................ 428/157 |
| 5,910,256 A | 6/1999 | Tsunetomo et al. | |
| 6,226,131 B1 * | 5/2001 | Son et al. | ....................... 359/738 |
| 7,251,398 B2 * | 7/2007 | Baets et al. | ..................... 385/52 |

(Continued)

FOREIGN PATENT DOCUMENTS

| | | |
|---|---|---|
| JP | 63167301 A | 7/1988 |
| WO | 2006001183 A1 | 1/2006 |

OTHER PUBLICATIONS

D. Meyerhofer, "Dichromated Gelating", "Holographic Recording Material", XX,XX, Jan. 1, 1977, pp. 75-79, XP09027062.

*Primary Examiner* — Audrey Y Chang

(57) ABSTRACT

A method of manufacturing a shaped polymer device comprises forming a planar polymer layer over a substrate which has a lower coefficient of thermal expansion than the polymer layer; and shaping the polymer layer using a laser ablation process. This method uses a substrate with low thermal expansion to limit the expansion of the attached polymer layer when it is being shaped by a laser ablation process. In addition there is provided a lens structure for an *autostereoscopic display device comprising a substantially planar glass substrate and a polymer layer defining a lenticular arrangement provided over the glass substrate.

10 Claims, 2 Drawing Sheets

(56) References Cited

U.S. PATENT DOCUMENTS

| | | | |
|---|---|---|---|
| 7,309,562 B2 * | 12/2007 | Tomizawa | 430/321 |
| 7,545,565 B2 * | 6/2009 | Tomczyk | 359/619 |
| 2002/0017116 A1 | 2/2002 | Koyama et al. | |
| 2005/0052737 A1 | 3/2005 | Amemiya et al. | |
| 2005/0057705 A1 | 3/2005 | Yamanaka et al. | |
| 2005/0059487 A1 | 3/2005 | Wilder et al. | |
| 2005/0098257 A1 | 5/2005 | Bauer et al. | |
| 2007/0231541 A1 * | 10/2007 | Humpal et al. | 428/141 |

* cited by examiner

LENS STRUCTURE AND MANUFACTURING METHOD, AND THE MANUFACTURE OF SHAPED POLYMER ARTICLES

This is a divisional of prior application Ser. No. 12/519,386 filed Jun. 16, 2009 and is incorporated by reference herein

FIELD OF THE INVENTION

This invention relates to a lens structure and manufacturing method, for an autostereoscopic display device, and also relates more generally to the manufacture of shaped polymer articles.

BACKGROUND OF THE INVENTION

A known autostereoscopic display device is illustrated in FIG. 1. This known device 1 comprises a two dimensional liquid crystal display panel 3 having a row and column array of display pixels 5 acting as a spatial light modulator to produce the display. For the sake of clarity, only a small number of display pixels 5 are shown in FIG. 1. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises an array of lenticular elements 11 extending parallel to one another, of which only one is shown with exaggerated dimensions for the sake of clarity.

Thus, an array of elongate lenticular elements 11 extending parallel to one another overlies the display pixel array, and the display pixels 5 are observed through these lenticular elements 11.

The lenticular elements 11 act as a light output directing means to provide different images, or views, from the display panel 3 to the eyes of a user positioned in front of the display device 1. The above described device provides an effective three dimensional display device (if the image comprises multiple views).

In an arrangement in which, for example, each lenticular element 11 is associated with two columns of display pixels 5, the display pixels 5 in each column provide a vertical slice of a respective two dimensional sub-image. The lenticular sheet 9 directs these two slices and corresponding slices from the display pixel columns associated with the other lenticular elements 11, to the left and right eyes of a user positioned in front of the sheet, so that the user observes a single stereoscopic image.

The lenticulars are mounted in front of the display and need to be aligned accurately with respect to the pixels in order to project the correct pixel information. For the same reason the dimensions of the lens array, such as the pitch and the lens shape, need to be maintained during thermal cycles. This presents difficulties in the design and manufacture of the lenticular lens array.

Examples of manufacturing techniques for lenticulars are replication techniques such as UV-replication, in-mould pressing (compression moulding) and embossing. Direct structuring methods can also be used, in which a polymer plate is shaped by laser ablation. Reflow methods are also known in which the lens shapes are defined by a melting and re-solidification process.

Compared to glass, the thermal coefficient of expansion of polymers is high, for example $200$-$700 \times 10^{-7}/°C$. for plastic and $60$-$120 \times 10^{-7}/°C$. for glass. This high thermal coefficient of expansion results in unacceptable dimensional and alignment inaccuracies of the lenticular, resulting in poor 3D performance.

SUMMARY OF THE INVENTION

According to the invention, there is provided a lens structure for an autostereoscopic display device comprising:
 a substantially planar glass substrate; and
 a polymer layer defining a lenticular arrangement provided over the glass substrate.

This lens structure has a stable glass substrate on which a polymer sheet is formed (e.g. laminated). The lens structure when applied onto a display panel will have lower alignment and dimensional inaccuracies due to the thermal expansion mismatch between the panel and lenticular. Thermal stress due to the thermal expansion mismatch between the panel and lenticular can also be reduced.

This lens structure can be used as a substrate to which laser structuring is applied, with thermal expansion caused by the laser process being controlled and limited by the glass substrate. This is particularly suitable for large area lens structures, for example for lenticular arrangements having an area greater than 100 cm.sup.2, or more preferably greater than 400 cm.sup.2 and even more preferably greater than 900 cm.sup.2.

The glass substrate may have a thickness at least as great as the polymer layer, and the polymer layer preferably has a maximum thickness (i.e. a thickness before it is shaped) of less than 1 mm. The polymer layer can be bonded to the glass layer using a pressure sensitive adhesive, for example with a thickness less than 0.2 mm.

The invention also provides an autostereoscopic display device comprising a display panel for producing a display and a lens structure of the invention.

The invention also provides a method of manufacturing a shaped polymer device, comprising:
 forming a planar polymer layer over a substrate which has a lower coefficient of thermal expansion than the polymer layer; and
 shaping the polymer layer using a laser ablation process.

This method uses a substrate with low thermal expansion to limit the expansion of the attached polymer layer when it is being shaped by a laser ablation process. The invention relates to the use of a polymer laser ablation process, and this can be used as a technique for manufacturing lenticulars that can either be used as a master for use in a replication process, or for the direct manufacture of the lens component.

Thus, the shaped polymer layer may define an array of lenticular elements, and in this case, the substrate is preferably glass. The method can be for manufacturing a lenticular array for an autosteroscopic display device. The method then reduces dimensional inaccuracies which can otherwise arise due to thermal expansion during laser ablation.

Instead, the shaped polymer layer can define a mould for use in manufacturing an array of lenticular elements by a replication process. In this case, the substrate does not need to be transparent, and may comprise a metal sheet. The mould can then be used to manufacture the array of lenticular elements for an autostereoscopic display device. The method again reduces dimensional inaccuracies during the lens formation, as there will be reaction heat of the UV curing process of the replication method, with resulting thermal expansion.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention provides methods for manufacturing shaped polymer articles, such as a lens structure for an autostereoscopic display device, in which the manufacture involves forming a planar polymer layer over a substrate which has a lower coefficient of thermal expansion than the polymer layer, and shaping the polymer layer using a laser ablation process. The heat generated by the laser ablation process tends to expand the polymer, but this expansion is constrained by the underlying substrate. The shaped polymer can be a lens structure or an inverse for use in a subsequent replication process.

Figure 1:
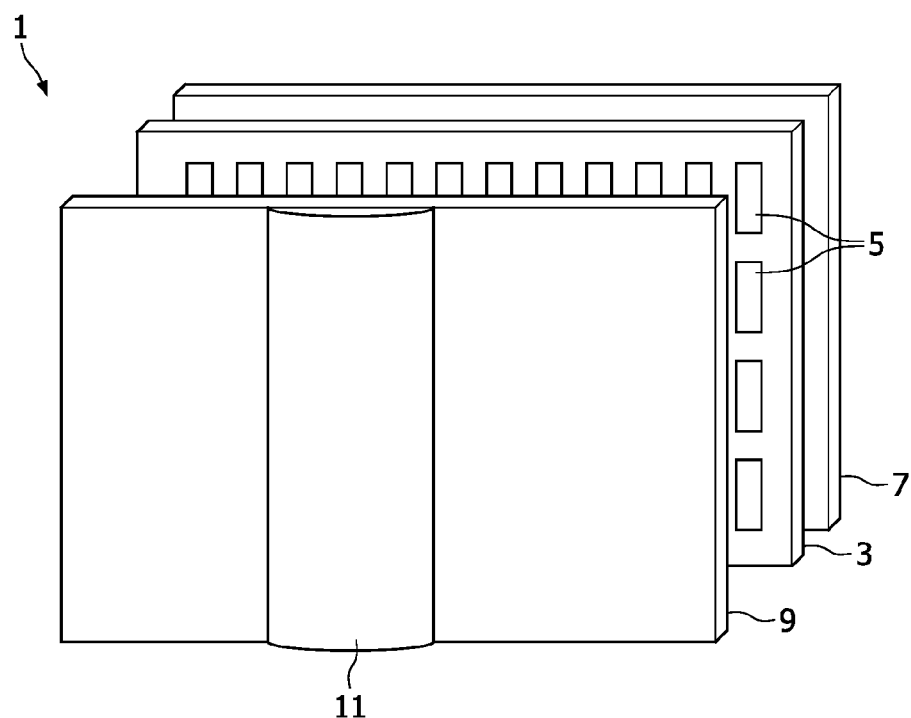
FIG. 1 is a schematic perspective view of a known autostereoscopic display device.
Figure 2:
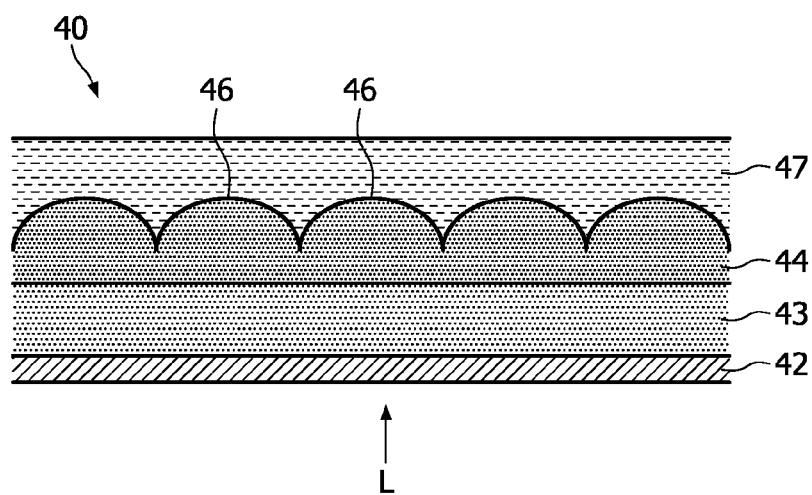
FIG. 2 is a schematic cross-sectional view of an autostereoscopic display device having a lens arrangement according to an embodiment of the invention.

FIG. 2 is a schematic cross-sectional view of an autostereoscopic display device 40 according to an embodiment of the invention. The autostereoscopic display device 40 comprises a two dimensional liquid crystal display panel 42 for producing a display. The structure of the liquid crystal display panel 42 is entirely conventional.

In a similar fashion to a known autostereoscopic display device (as described in the background section of this application), the display panel 42 is illuminated by a light source (not shown). Light from the light source (indicated generally by the arrow labelled "L") is directed through the display panel 42, with individual display pixels of the display 42 being driven to modulate the light and produce an image.

The lens structure in an autostereoscopic display device of the invention has a planar glass substrate 43 and a polymer layer 44 defining the array of lenticular elements 46. As shown in FIG. 2 for example, the polymer layer 44 has a planer portion provided onto the surface of the glass substrat 43 and has a thickness that extends away from the surface of substrate 43. A curved portion of the lenticular elements 46 project outward from the polymer layer. The lenticules between adjacent ones of the lenticular elements project outward from the thickness of the planer portion and the surface of the glass substrate 43 towards a display side of the lens structure. The glass substrate provides stability, and the lens structure has lower alignment and dimensional inaccuracies over the display panel 42 due to the thermal expansion mismatch between the panel and lenticular. Thermal stress due to the thermal expansion mismatch between the panel and lenticular can also be reduced.

The lens structure shown in Fig. 2 can be shaped by a laser ablation process, applied to the layer 44 while supported by the underlying substrate. Thus, laser structuring is applied directly to the lens structure, and thermal expansion caused by the laser process is controlled and limited by the glass substrate. This is particularly suitable for large area lens structures, for example the invention can be used for lenticular arrays 42 inch (105 cm) diagonal displays.

In the configuration of FIG. 2, the glass substrate may have a thickness at least as great as the thickness of the polymer layer, for example at least about 0.5 mm and typically approximately 2 mm, and the polymer layer may have a thickness before it is shaped of less than 1 mm, for example approximately 0.1 mm. The polymer layer is bonded to the glass layer using a pressure sensitive adhesive, for example with a thickness of 0.02 mm.

FIG. 2 also shows an optional replica layer 47 over the lens layer.

Figure 3:
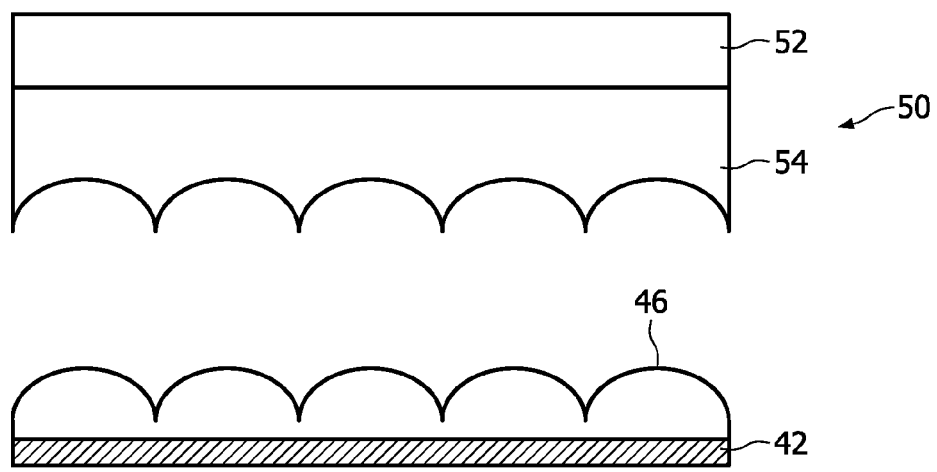
FIG. 3 is used to explain a different manufacturing method of the invention for the lens arrangement of an autostereoscopic display device.

In the example of FIG. 2, the lens structure is shaped directly, but a replication process may instead be used, as shown in FIG. 3.

The replication mould 50 comprises a substrate 52 of lower coefficient of thermal expansion than an overlying polymer layer 54 which is shaped by the laser ablation process to define the replica inverse lenticular shape shown. As also shown in FIG. 3, the resulting lens structure is formed from a single layer which is then provided over the display panel 42, or the lens structure may be provided over a separate substrate.

The replication process typically involves filling the replica with a liquid monomer, pressing the liquid into the replica using a substrate, and using UV photo polymerization to cure the polymer lens body. The resulting lens array can be removed from the substrate used to press the mould, or the substrate may form part of the lens array.

Thus, the invention can be applied to the lenticular sheet or the replication mould, and provides a thin polymer sheet laminated on another substrate instead of using a full polymer sheet. For direct manufacture of a lenticular sheet, the substrate material should be optically clear (for example glass) just like the polymer foil. For a replication mould neither of these needs to be optically clear, for example a metal (e.g. steel) substrate and an opaque polymer can be used.

The manufacturing method comprises lamination of the polymer foil on the glass or other substrate by using a pressure sensitive adhesive. The lens or replica shape is then structured into the polymer surface by laser ablation, and the shaped surface is then cleaned.

The effectiveness of the method can be demonstrated by analysing the relative displacement of the polymer layer compared to the underlying substrate during heating. For example, the expansion of the combined glass-polycarbonate structure can be analysed when heating in a cycle, for example from 20.degree. C. to 60.degree. C. This represents the typical thermal cycle of a display during operation.

It has been found by modelling that the relative shift of the polymer sheet with respect to the glass substrate is such that an overlay resulting at the edge of the display is much smaller than the overlay based on free expansion of the polymer.

The invention can be used in several fields where stabilization of polymer layers is required for good dimensional accuracy during processing and application. The text above relates to the manufacture of a thermally stable lenticular that can be directly mounted to on a 2D display to make a 3D display or that can be used as a master lenticular for replication. However, those skilled in art can well think of different applications.

The lenticulars are shown as semi-cylindrical lenses, but other designs are possible, such as discrete circular (or oval) lenses, or bi-convex lenses.

Various other modifications will be apparent to those skilled in the art.

Summarizing, the invention relates to a method of manufacturing a shaped polymer device comprises forming a planar polymer layer over a substrate which has a lower coefficient of thermal expansion than the polymer layer; and shaping the polymer layer using a laser ablation process. This method uses a substrate with low thermal expansion to limit the expansion of the attached polymer layer when it is being shaped by a laser ablation process.

It should be noted that the above-mentioned embodiments illustrate rather than limit the invention, and at that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. A method of manufacturing a shaped polymer device, comprising acts of:

forming a planar polymer layer over a planar glass substrate; and laser ablating the polymer layer, by direct removing the polymer material, over the glass substrate defining a lenticular arrangement of a plurality of lenticular elements.

2. The method as claimed in claim 1, the laser ablating defining a lenticular array for an autosteroscopic display device.

3. The method as claimed in claim 2, the laser ablating defining a one-dimensional elongated lenticular array with a plurality of elongated lenticular elements.

4. The method as claimed in claim 1, the lenticular arrangement comprising a first lenticular arrangement, defining a mold for shaping a second lenticular arrangement that complements the first lenticular arrangement.

5. The method as claimed hi claim 4, further comprising an act of molding, using the defined mold, the second lenticular arrangement as an autostereoscopic display device.

6. The method as claimed in claim 1, wherein forming the planar polymer layer over the substrate comprises an act of bonding the polymer layer to the substrate with a pressure sensitive adhesive.

7. The method as claimed in claim 1, wherein the act of defining the plurality of lenticular elements further comprises an act of defining a curved portion of each of the plurality of lenticular elements to project outward from the polymer layer deposited over the glass substrate.

8. The method as claimed in claim 1, wherein the act of defining the plurality of lenticular elements further comprises an act of defining projections between adjacent ones of the plurality of lenticular elements to project outward from the polymer layer deposited over the glass substrate.

9. The method as claimed in claim 1, wherein the act of forming the planar polymer layer comprises an act of forming the layer to be between 0.1 mm up to about 1 mm thick.

10. The method as claimed in claim 1, comprising an act of forming the glass substrate to be in a range of about 0.5 mm to about 2 mm thick.

\* \* \* \* \*